May 5, 1931.  J. N. WHITE  1,803,518
SPRING EXPANDING APPARATUS
Filed Nov. 1, 1927
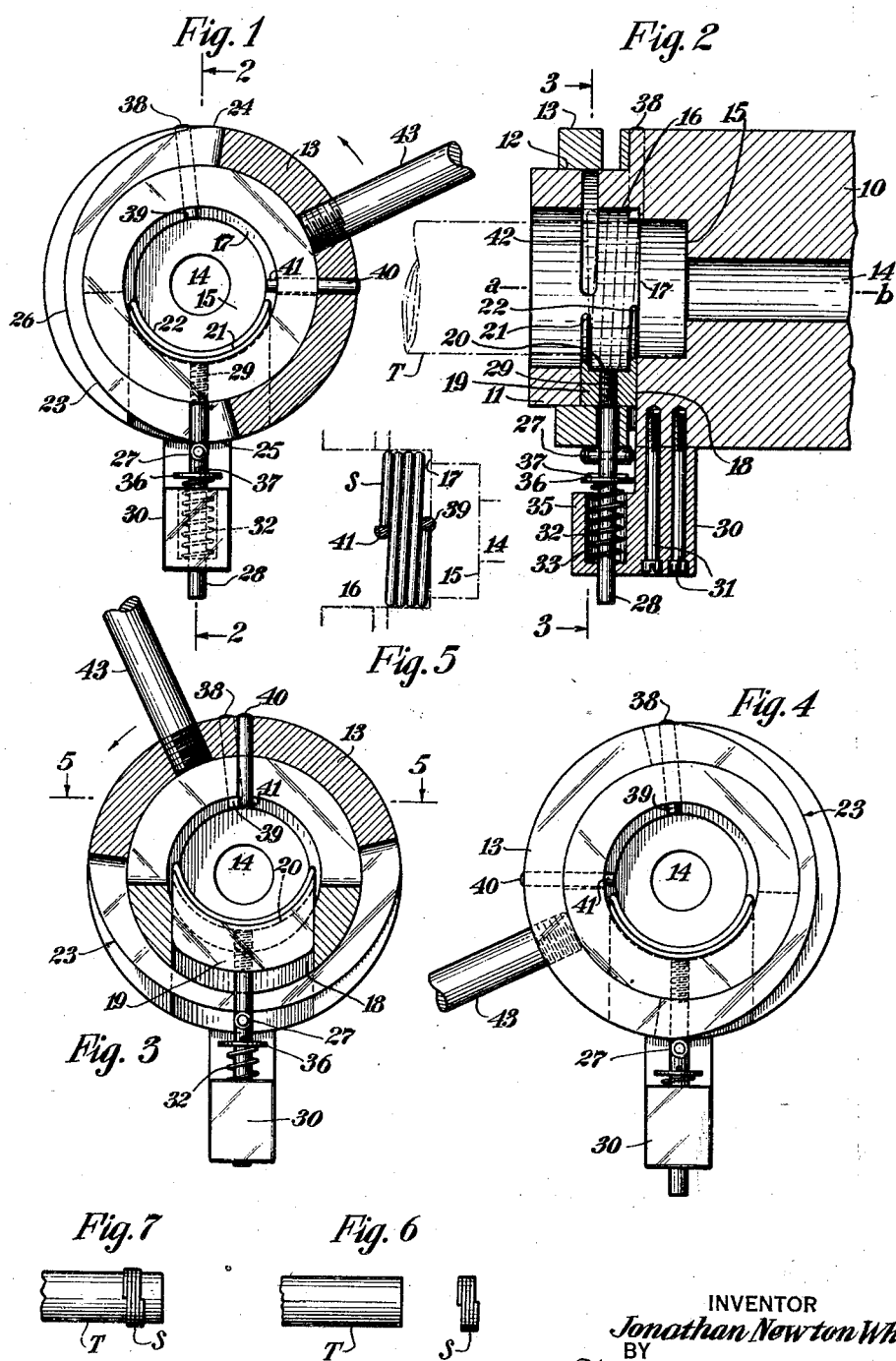
INVENTOR
Jonathan Newton White,
BY
Warren S. Orton.
ATTORNEY Patented May 5, 1931

1,803,518

UNITED STATES PATENT OFFICE

JONATHAN NEWTON WHITE, OF NEW YORK, N. Y., ASSIGNOR TO UNITED METAL HOSE CO. INC., OF NEW YORK, N. Y., A CORPORATION OF NEW YORK

SPRING-EXPANDING APPARATUS

Application filed November 1, 1927. Serial No. 230,375.

The invention relates in general to an apparatus for applying helically wound springs to tubing such as flexible hose and the like, and the present disclosure constitutes a companion application with my copending application Serial No. 230,376 filed under even date and entitled "Method and implement for expanding springs".

In the above identified application, there was featured a hand implement for use in applying a helically wound spring to the end of a tube in a preset relation to the end of the tube, and which implement was characterized by circumferentially movable abutments designed to engage the terminals of the spring to momentarily unwind the spring, thus increasing its internal diameter so as to permit of an easy sliding of the expanded spring onto the end of the tube which it is designed to engage. The device in the copending application was particularly constructed for use in connection with relatively light and thus comparatively weak springs and is utilized particularly in those situations where there is little if any tendency of the spring becoming displaced while being distorted.

The invention featured in this disclosure is designed particularly for use in connection with the expanding of helically wound springs where the spring tension is high which present more difficulty in distorting the same and where a greater manual power must be exerted than is sufficient in the case of the lighter hand implement disclosed in the above identified application.

The principal object of the invention in this disclosure, as was the case in the copending application, is to provide a simple form of hand actuated machine by means of which the spring may be circumferentially distorted to increase the normal diameter of its convolutions and to retain the latter in this distended condition until the spring is slipped on the tube with which it is intended to engage.

Another object of the invention is to provide a simple form of machine of the type outlined which will hold the spring securely while it is being distorted from its normal position, accordingly the invention features the providing of manually actuated clutching means for engaging the sides of the springs to clamp the same in position while its diameter is being increased; for holding the spring in a distorted position while the tube is being inserted therein and for permitting the gradual releasing of the spring to cause it to frictionally grip the tube.

Another object of the invention is to provide as part of the spring expanding features a clamp which can be moved into secure clutching engagement with the spring when in its normal contracted position; which will automatically expand with the expansion of the spring in proper timed sequence to its increase in diameter, which will contract with the subsequent contraction of the spring about the tube so that during the entire expanding and contracting operation the spring will be firmly held by the clutching means.

Still another object of the invention is to provide an improved form of spring end or terminal engaging members which will function in proper sequential relation to the movement of the spring clutching means and will coact therewith to insure an easy, smooth and uniform distention and contraction of the spring without deleterious effect on the same.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawing:

Fig. 1 is a front view of a spring distending apparatus constituting a preferred embodiment of the invention with cam ring shown in section.

Fig. 2 is an axial vertical sectional view taken on the line 2—2 of Fig. 1 with the clutch jaw in its normal retracted and clutch open position to receive the spring.

Fig. 3 is a transverse sectional view taken on the line 3—3 of Fig. 2 with the clutch in its most contracted position at the start of the spring distending operation.

Fig. 4 is a view in end elevation looking at the construction from the left side of Fig. 2, and with the clutch again in its fully opened position at the termination of the spring expanding movement.

Fig. 5 is a view of spring looking in direction of arrows shown at 5—5 of Fig. 3 with support shown in dot and dash lines, and showing spring engaged by the spring and abutments shown in section.

Figs. 6 and 7 are explanatory views showing first, the positioning of the spring offset from the tube and in position on the tube.

In the showing it is intended that the disclosure constitute part of a machine designed to contain different size spring holders or supports one of which is shown at 10, each designed to receive and operate on a particular size of spring S and tube T, it being understood that a different dimensioned support is substituted in the machine for the support 10 when it is desired to operate on a different size or character of spring or tube. The support 10, particularly shown in Fig. 2 is provided at one end with a reduced extension 11, the outer periphery 12 of which provides an actuating ring bearing for an actuator ring 13 hereinafter more fully described.

Extending centrally through the support is a bore 14, the end of which extending axially through the reduced portion 11 is twice enlarged, first to provide a tube receiving recess outlined at its inner end by a stop shoulder 15 designed to constitute an abutment for the end of the tube $t$ and spaced from the means for holding the spring S to locate the spring in preset spaced relation to the adjacent end of the tube as shown in Fig. 7. The outer portion of the tube receiving bore is again enlarged to provide a spring receiving space 16, outlined at its rear end with a spring stop annular shoulder 17.

The lower portion of the extension 11 is cut through adjacent the shoulder 17 to provide a guideway 18 (see Fig. 3) in which is slidably mounted a spring clamping clutch jaw 19 for movement radially of the axis of the tube indicated by the line $a$—$b$ centered in the bore 14. The jaw is provided on its upper or inner face with a spring seat 20 having a curvature conforming substantially to the curvature of the adjacent side of the spring S and extending about the same for a radial distance of about 135 degrees. In order to assist in preventing axial movement of the spring while being distorted, the seat 20 is outlined on opposite longitudinal sides by upstanding spring retaining flanges 21 and 22. It is understood that the parts are so proportioned that when the jaw is in the retracted position shown in the Figs. 1 and 2, the spring S may be readily inserted over the outer ledge 21 and disposed in position with the upper side of its innermost turn engaging the shoulder 17 as indicated in dot and dash lines Fig. 2, and that the upper portion of the bore 16 constitutes the fixed element of the spring clamping means featured in this disclosure. It is intended that when actuating the device to distend the spring as hereinafter described, the clamping jaw 19 be moved first from the position shown in Fig. 2 into the position shown in Fig. 3 to clamp the spring, and then gradually retreat with the spring towards the initial position shown in Fig. 4 as the spring diameter becomes enlarged. For this purpose the clamping jaw 19 is under the control of the actuator ring 13, which is designed to compensate for the resulting increase in diameter of the spring as its ends are moved. The ring is provided on its outer periphery with a cam face 23 which extends in an arc about the axis $a$—$b$ for about 200 degrees as particularly shown in Fig. 3. This cam face is therefore concentric relative to the axis $a$—$b$ and has its ends 24 and 25 equally spaced from the axis its maximum distance and gradually decreasing to its mid point 26 spaced from the axis the minimum distance. In bearing engagement with the cam surface 23 is a roller 27 extending transversely from a plunger rod 28 extending radially of the bore 16 and having its upper or inner end 29 threaded into the jaw 19 at the center of its arc as shown in Fig. 1. The plunger rod 28 depends below the support 10 and has its lower end slidably guided in a plunger block 30 demountably secured to the underside of the support 10 by means of long screws 31. The roller 27 is maintained in bearing engagement with the cam face of the actuator ring by means of a coiled spring 32 contained in a spring receiving pocket 33 formed in a forwardly extending portion 35 of the block which underlaps the reduced portion 11. The lower end of the spring bears on the portion 35 at the lower end of the pocket and its upper end bears against a stop washer 36 secured to the plunger rod 28 and held in position by pin 37.

The support 10 is provided with a fixed spring terminal engaging abutment 38 intruded through the top of the support and having its inner end 39 projecting into the bore recess 16 adjacent the shoulder 17 and in position to engage one end of the spring S.

The actuator ring 13 is provided with a similarly shaped rotatable spring end engaging abutment 40, the inner end 41 of which projects into the bore 16 in spaced relation to the shoulder 17 a distance equal to the distance between the ends of the spring considered axially. The pin 40 extends through an arcuate slot 42 formed in the reduced portion 11 as particularly shown in Fig. 2. The abutments are moved relative to each other and the clamping jaw 19 simultaneously actuated by means of a handle 43 projecting laterally from the actuator ring 13.

In operation and assuming that the clamping jaw is in its retracted position shown in Fig. 1, the spring S is inserted manually into position over the flange 21 and with its forward end engaging the shoulder 17 and flange 22 as shown in dot and dash outline in Fig. 2. The handle 43 is then moved from the position shown in Fig. 1 anticlockwise which will cause the end 41 of the rotatable abutment 40 to engage the outer, or left end terminal of the spring and acting through the spring will turn the same bodily about its own axis and until the opposite, inner or right end terminal of the spring is brought into bearing engagement with the end 39 of the fixed abutment 39. At the same time this movement will cause the roller 27 which at all times is pressed by spring 32 into engagement with the retreating cam surface 23 to move upwardly. This in turn will cause the plunger to shift the movable jaw 19 into pressing engagement with the underside of the spring and to lift the same slightly into engagement with the top curved surface of the bore 16 and until the jaw is in the position shown in Fig. 3. Continued movement of the actuating ring will cause the movable abutment to turn about the end of the ring circumferentially thus causing the ends to move relative to each other, exerting torque on the convolutions of the spring and causing the spring as a whole to increase in internal diameter. During this expanding of the ring the clutch jaw 19 will be moved backwardly from the position shown in Fig. 3 towards and finally into the position shown in Fig. 4. The cam is so laid out that the retreat of the jaw from the position shown in Fig. 3 to the position shown in Fig. 4 will permit the free expansion of the spring and at the same time maintain the spring clutched in position and held against accidental displacement. Finally the clutch jaw will be in the position shown in Figs. 2 and 4 with the spring held distorted in its open position. The tube T is then inserted through the bore of the spring and advanced until the end of the tube is in engagement with the stop shoulder 15 as indicated in Fig. 2. This will, of course, have the effect of locating the spring in definite fixed relation to the end of the tube. The camming ring is then re-rotated clockwise from the position shown in Fig. 4 back towards the initial position shown in Fig. 1. During this retreating of the spring towards its initial position, it will be permitted to move into firm frictional clutching engagement with the tube and when the camming ring is fully restored to its initial position the clutch will be open and the tube with the spring thereon may be readily withdrawn and the apparatus disposed in position to receive another spring.

In the showing in Fig. 6, the spring S and tube T are shown with the spring in its normal contracted position before it is inserted on the tube and in Fig. 7 the spring is in frictional engagement with the tube and accurately spaced a preset distance from its end.

By means of the device thus disclosed, it is possible to manipulate any size or strength of spring, it being obviously possible to actuate the camming ring by mechanical power in case manual efforts would not be sufficient to effect the necessary distortion of the spring. The spring is at all times held firmly by the automatic clutch in its several adjusted positions and by a proper designing of the controlling cam of the clutch the spring can be held without any resulting permanent distortion or displacement of the same from its finally intended configuration. No particular care need be exercised on the part of the operator, to actuate the device, it being simply necessary to slip the spring in position and which position is defined by the stops and shoulders. In general it is possible to rapidly affix the springs to the tubing with each spring definitely located a distance from the end of the tubing exactly the same for every insertion.

I claim:

1. In a device for circumferentially expanding and applying helically wound springs to tubes, the combination of a support having a tube receiving bore, provided with an enlargement at one end to form a spring receiving bore, a plunger block secured to the support, an actuator ring mounted on the support for rotary movement about the axis of the bore, said ring having its external periphery concentric relative to the axis of the bore and providing a semi-circular cam surface with both of its ends spaced from the axis of the bore a distance greater than the spacing of its mid-portion, a spring engaging jaw guided in the support for movement transversely of the bore, a plunger secured to the jaw projecting laterally therefrom and guided in the plunger block, a roller carried by the plunger and engaging said cam surface for causing the jaw first to approach the axis of the bore and then recede therefrom when the ring is rotated in one direction, and a spring between the plunger block and the plunger for maintaining the roller in bearing engagement with the cam surface.

2. In a device of the class described, the combination of a support having a bore, twice reduced to form a tube receiving bore and a spring receiving bore with stop shoulders for limiting the axial movements of the received tube and spring, clamping means for securing a spring in the spring receiving bore, and means for engaging the spring to increase its internal diameter and thus permit the insertion of a tube through the increased diameter of the spring, into the tube receiving bore and into engagement with the shoulder forming the end of the tube receiving bore.

3. A device for circumferentially expanding and applying helically wound spring to tubes, comprising a support provided at one end with a reduced extension constituting a cylindrical bearing and said extension provided axially thereof with a tube receiving bore, said support providing a tube stop shoulder at the inner end of the bore, a fixed abutment having a spring engaging end intruded into said bore, an actuating ring rotatably mounted on said bearing and provided with a rotatable abutment having a spring engaging end intruded into the bore, a spring clamping jaw guided in the extension for radial movement into said bore and caming means carried by the ring for controlling said jaw.

4. In a device for circumferentially expanding helically wound springs and for subsequently permitting them to contract under tension, the combination of means for engaging opposite sides of the spring to clamp the same, means for engaging the terminals of the spring to move the same circumferentially relative to each other and thus temporarily increase the diameter of the spring and to permit the ends to return towards their initial positions under the tension of the spring, and a single control operable in one direction for actuating said terminal engaging means and simultaneously shifting the clamping means to insure the clamping of the spring during the varying changing of its diameter.

5. In a device for circumferentially expanding helically wound springs, the combination of means for engaging opposite sides of the spring to clamp the same, means for engaging the terminals of the spring to move the same circumferentially relative to each other and thus increase the diameter of the spring and control means operatively connected to cause the clamping means to be released automatically as the terminal means are moved to expand the spring.

6. In a device of the class described, the combination of a support provided with a spring receiving bore, an actuator ring mounted on the support for rotary movement about the axis of the bore, said ring provided with a cam surface, concentric relative to the axis of the bore, a clamping jaw guided in the support for movement transversely of the bore, a spring pressed plunger tending to move the jaw towards the axis of the bore and a roller carried by the plunger in bearing engagement with said cam surface.

7. In a device for circumferentially expanding helically wound springs, the combination of spring clamping means for engaging the outside of the springs, a pair of spring end engaging abutments carried by said means and mounted thereon for relative movement circumferentially of the turns of the spring, and an actuating member operatively connected to cause simultaneously the clamping means to engage the spring and to cause the abutments to move the ends of the spring relative to each other and thus exert torque on the convolutions of the spring.

8. In a device for circumferentially expanding helically wound springs, the combination of clamping means for holding the spring diametrically and means for engaging opposite ends of the spring and movable circumferentially of its turns for exerting torque on its convolutions.

9. In a device for circumferentially expanding helically wound springs, the combination of a support provided with a spring receiving bore, a spring clamping jaw guided in the support for movement transversely of the axis of the bore and adapted to engage one side of a spring to clamp the same against the opposite side of the bore and means for controlling the jaw.

10. In a device for circumferentially expanding helically wound springs, the combination of a support provided with a spring receiving bore, a spring clamping jaw guided in the support for movement transversely of the axis of the bore and adapted to engage one side of a spring to clamp the same against the opposite side of the bore, and manually actuated camming means controlling the jaw for moving the same to and from its spring clamping position.

11. In a device of the class described, the combination of a support provided with a spring receiving bore and having a fixed abutment intruding into the bore, an actuating ring rotatably mounted on the support and provided with a rotatable abutment intruded into the bore, said abutments adapted to engage the ends of a helically wound spring positioned in the bore and disposed to apply torque to the convolutions of the spring when the ring is rotated.

12. In a device of the class described, the combination of a support provided with a spring receiving bore and having a fixed abutment intruding into the bore, an actuating ring rotatably mounted on the support and provided with a rotatable abutment intruded into the bore, said abutments adapted to engage the ends of a helically wound spring positioned in the bore and disposed to apply torque to the convolutions of the spring when the ring is rotated and means for clamping the ring in position in the bore.

13. In a device for circumferentially expanding helically wound springs, the combination of clamping means for engaging opposite sides of the spring to hold the same radially, means for engaging the ends of the clamped spring for moving the ends circumferentially relative to each other and means operable with the spring end engaging means for releasing the clamping means during the relative movement of the spring ends.

14. In a device for circumferentially expanding helically wound springs, the combination of a spring holder for encircling the spring and a pair of spring terminal engaging members mounted for relative rotary movement in the plane which defines the surface of a cylinder for causing relative circumferential movement of the ends of the spring held by the holder.

15. In a device of the class described, the combination of a clamp comprising a fixed and a movable jaw, the fixed jaw provided with a spring terminal engaging abutment, and an actuator mounted for rotary movement and provided with a spring terminal engaging abutment movable relative to the fixed abutment, said actuator operatively connected to the movable jaw to control the same in a timed relation to the movement of the rotatable abutment.

Signed at New York, in the county of New York and State of New York, this 25th day of October, A. D. 1927.

JONATHAN NEWTON WHITE.